United States Patent Office 3,220,976
Patented Nov. 30, 1965

3,220,976
PROCESS FOR THE PREPARATION OF COPOLY-
ESTERS COMPRISING REACTING A BISHALO-
FORMATE OF A DIHYDROXY COMPOUND
WITH A DIFUNCTIONAL CARBOXYLIC ACID IN
A SOLUTION CONTAINING TERTIARY AMINE
Eugene P. Goldberg, Pittsfield, Mass., assignor to General
Electric Company, a corporation of New York
No Drawing. Original application Aug. 22, 1957, Ser.
No. 679,747, now Patent No. 3,030,331, dated Apr. 17,
1962. Divided and this application June 15, 1961,
Ser. No. 124,265
12 Claims. (Cl. 260—47)

This is a division of application Serial No. 679,747 filed August 22, 1957, and issued on April 17, 1962 as U.S. patent 3,030,331.

This invention relates to the preparation of esters by a novel ester synthesis. More specifically, this invention relates to a process for the preparation of both monomeric and polymeric esters by reacting a haloformate of a hydroxy compound with a carboxylic acid with or without additional hydroxy compound. The process is characterized by relatively mild reaction conditions and can be used for the preparation of a wide variety of esters, polyesters and copolyesters.

Many methods for the preparation of esters are known. Among these are direct esterification by the reaction of a carboxylic acid and a hydroxy compound; ester exchange reactions involving the reaction of an ester with a hydroxy compound; or reactions involving the use of organic acid chlorides or anhydrides with hydroxy compounds. Each of these methods of preparation has certain inherent limitations or shortcomings. Direct esterification and ester exchange methods, for example, require relatively high temperatures of the order of 200° to 300° C. and high vacuums for obtaining highly polymerized esters. The reaction rates in direct esterification and ester exchange syntheses are relatively slow and it is difficult to obtain high molecular weight polyesters in the absence of long reaction times. The high temperatures necessary promote degradation of reactants and reaction products and, as a result, certain polyesters cannot be prepared by these methods.

The preparation of esters by the use of organic acid chlorides is likewise not entirely satisfactory because of the fact that acid chlorides are not readily available, are expensive and, in addition, are relatively unstable. Many anhydrides are similarly not readily available and some carboxylic acid anhydrides cannot be prepared at all. In addition, esterification using anhydrides often suffers the disadvantages mentioned above for ester exchange or acid-alcohol condensation.

British Patent 730,599 describes a method of preparing esters by reacting a chlorocarbonic acid ester of a hydroxy compound with a carboxylic acid. The reaction is carried out in the presence of a small amount of a catalyst such as a tertiary amine or a finely divided metal in the absence of a solvent or in the presence of an aqueous solvent. The temperatures of reaction are from about 90° to 160° C. While this process overcomes some of the difficulties previously encountered with ester syntheses, the temperatures of reaction are still of a relatively high order and moreover, it is still difficult in many cases to obtain high molecular weight polyesters.

The present invention has for its principal object a method of ester synthesis avoiding the problems heretofore encountered in such reactions. More particularly, the process of the present invention enables the preparation of a wide variety of monomeric esters, polyesters and copolyesters by a relatively simple reaction, requiring inexpensive ingredients which reaction is carried out at temperatures below about 75° C. and preferably from 20° to 50° C. Because of the mild reaction conditions, degradative side reactions are substantially eliminated. Moreover there is no evolution of a corrosive gas such as HCl, in the course of the reaction.

Briefly stated, the process of this invention comprises the reaction of a haloformate of a hydroxy compound with (1) a carboxylic acid or (2) a carboxylic acid and a hydroxy compound, at a temperature below 75° C., in an organic solvent comprising in excess of a molar equivalent of a tertiary amine for each molar equivalent of haloformate. The products of the reaction are the desired ester, the tertiary amine halogen acid salt and carbon dioxide. By using monofunctional acids or hydroxy compounds, monomeric esters or mixtures of monomeric carbonate and carboxylate esters can be obtained; by using polyfunctional acids and hydroxy compounds, polymeric esters can be obtained; and by suitable adjustment of ratios of reactants, copolyesters containing both carbonate

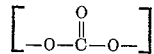

and carboxylate

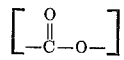

groups can be obtained. The polymerization reactions are carried out by solution polymerization thereby allowing the formation of extremely high molecular weight polymers. The reaction is rapid and the preparation of thermally unstable esters is made possible because of the absence of high temperature reaction conditions.

In accordance with one modification of the present invention, the haloformate of the hydroxy compound is formed in situ by passing a carbonyl halide illustrated by phosgene or bromophosgene, through a solution of the carboxylic acid and the hydroxy compound. If more than an equivalent amount of hydroxy compound, in comparison with carboxylic acid, is present, a copolyester or mixed monomeric esters (one of which is a carbonate ester) will result if the carboxylic acid itself contains no hydroxy groups. If less than an equivalent amount of hydroxy compound is present, a homopolyester or a monomeric ester will result.

When monomeric or polymeric esters are prepared by the reaction of a haloformate with a carboxylic acid, it is preferable to employ essentially equivalent amounts of the reactants. Where the haloformate reacts with both a carboxylic acid and a hydroxy compound, the quantity of haloformate required will be essentially equivalent to the amount of both the hydroxy and acid reactants.

Where the carbonyl halide method is used to form the haloformate in situ, in excess of two molar equivalents of tertiary amine for each molar equivalent of the carbonyl halide is required. This arises from the fact that the carbonyl halide is the precursor of two molar equivalents of halogen acid, the latter being evolved in the course of the reaction.

The hydroxy compounds which may be used are, in general, any mono- or polyhydroxy compounds heretofore used in the preparation of known esters. Thus, the mono- and polyfunctional, saturated and unsaturated, aliphatic, cycloaliphatic, aliphatic-aromatic, aromatic and heterocyclic alcohols and phenols can be employed. Such saturated monohydric alcohols as methyl, ethyl, propyl, butyl, chlorobutyl, etc. alcohols, unsaturated alcohols such as allyl or crotyl alcohol, cycloaliphatic alcohols such as cyclohexanol, polyhydric alcohols such as ethylene glycol, 1,4-butanediol, polyethylene glycol, trimethylene glycol, glycerine, pentaerythritol, sorbitol, or 1,6-hexamethylene glycol may be used. Other glycols which are useful are disclosed in my copending application S.N. 638,239, filed February 5, 1957, assigned to the same assignee as the present invention. The aromatic hydroxy compounds may be monocyclic or polycyclic aromatic compounds such as phenol, bisphenols, resorcinol, cresols, hydroquinone, pyrogallol, etc. Useful dihydric phenols are also more fully disclosed in my above copending application S.N. 638,239 and in my copending application S.N. 679,743, assigned to the same assignee as the present invention and filed concurrently herewith.

As stated above the present synthesis involves the reaction of a haloformate of a hydroxy compound and an acid with or without adidtional hydroxy compound. The hydroxy compound from which the haloformate is formed may be the same or different than any additional hydroxy compound added to the reaction mixture. The general class of hydroxy compounds encompassed within the scope of the present disclosure will however be the same for both the haloformate derivative and the hydroxy compound added as such.

The carboxylic acids, as in the case of the hydroxy compounds, may be any mono or polyfunctional carboxylic acid, it being only necessary that the carboxylic acid contain no olefinic conjugated double bonds. Stated otherwise, the carboxylic acid should be saturated in the alpha,-beta position. Monofunctional acids useful in the preparation of simple monomeric esters are formic, acetic, propionic, stearic and phenylacetic acids. Monocarboxylic aromatic acids such as benzoic acid and its homologues, difunctional aromatic acids such as diphenic acid, phthalic acid, terephthalic acid and isophthalic acid, tricarboxylic acids such as citrus acid, trimesic acid and other polyfunctional acids may be used. Hydroxy acids, including hydroxybutyric and hydroxybenzoic acid may also be used. Examples of additional difunctional carboxylic acids can be found in my above referred to copending application S.N. 679,743.

The reaction is carried out in a substantially non-aqueous organic solvent system comprising a tertiary amine. Organic solvents which may be used for the preparation of the esters will, in general, be any organic solvent which is inert to the reactants and preferably in which the reactants and the resulting ester are soluble. The solvent may consist entirely of the tertiary amine or it may comprise a tertiary amine in combination with such solvents as benzene, xylene, ethylene, dichloride, propylene dichloride, chlorobenzene, toluene, carbon tetrachloride, acetone, chloroform, cyclohexanone, or other well known inert organic solvents. The tertiary amine acts simultaneously as a catalyst, an acid acceptor for the halogen acid, and as a solvent for the polymer. In general, any tertiary amine may be used which is inert to the reaction conditions. It is preferable that it be a polymer solvent, although not essential as the adidtional solvent may, if present in sufficient quantity, act as polymer solvent. Suitable examples of tertiary amines in addition to pyridine are triethyl, tributyl, and tripropyl amine, quinoline, acridine or dimethylaniline. Mixtures of the foregoing solvents may also be used. Although the quantity of tertiary amine used is important, the amount of other solvent used may be widely varied depending on reactants used, degree of polymerization desired, etc.

Although the process of the present invention can be used for preparing both monomeric esters and homopolyesters and both linear and cross-linked polymers, it is particularly suitable for the production of the linear copolyesters described in my copending application 679,743. In accordance with the preferred method of preparing these copolyesters, a carbonyl halide is passed into a tertiary amine-containing solvent solution of the acid and the hydroxy compound. In the case of the linear copolyesters of application S.N. 679,743, the hydroxy compound and acid are both difunctional. Thus the hydroxy compound will be either a glycol or dihydric phenol and the acid will be either a dibasic acid or a difunctional hydroxy acid. If a block copolymer or copolyester is to be prepared, the carbonyl halide is passed into a solution of the hydroxy compound alone or the hydroxy compound and the acid, after which additional hydroxy compound or additional acid is added, followed by further addition of carbonyl halide to a viscous end point. Alternatively, other block copolymers may be prepared by separately adding phosgene to a solution of the acid and hydroxy compound in one reaction vessel, adding carbonyl halide to a solution of the hydroxy compound in a second reaction vessel, mixing the two, thus formed prepolymers and adding phosgene to the mixture to form the final block copolymer.

In order that those skilled in the art may better understand how the process of the present invention may be carried out, the following examples are given by way of illustration and not by way of limitation.

*Example 1*

To a solution of 12.1 g. (0.1 mol) of benzoic acid in 75 grams (ca. 1 mol) of dry pyridine, was added 15.7 g. (0.1 mol) of phenylchloroformate, the chloroformate being added dropwise over a ten minute period. An exothermic recation occurred with the vigorous evolution of carbon dioxide. The temperature was maintained between 30° and 50° C. The reaction mixture was poured into 500 cc. ice water and an oil, which rapidly crystallized, separated. The yield of phenyl benzoate was 16.4 g.

*Example 2*

As in Example 1, 15.7 grams (0.1 mol) of phenyl chloroformate was added to a solution of 7.3 grams (0.05 mol) of adipic acid in 75 grams (ca. 1 mol) of pyridine. Diphenyl adipate was isolated as above, and weighed 9.0 g.

*Example 3*

Diphenyl succinate was prepared as in Example 1, using 15.7 g. (0.1 mol) of phenyl chloroformate, 5.9 g. (0.05 mol) of succinic acid and 75 g. (ca. 1 mol) of pyridine.

*Example 4*

Di-*n*-propyl terephthalate was prepared as in Example 1, using 12.3 g. (0.1 mol) of n-propyl chloroformate, 8.3 g. (0.05 mol) of terephthalic acid and 75 g. (ca. 1 mol) of pyridine.

*Example 5*

Phenyl benzoate was prepared by bubbling ca. 12 g. (0.12 mols) phosgene into a solution of 12.2 g. (0.1 mol) of benzoic acid and 9.4 g. (0.1 mol) of phenol in 75 g. (ca. 1 mol) pyridine. The reaction was exothermic and evolved $CO_2$.

*Example 6*

To a 1-liter flask equipped with stirrer, thermometer and gas inlet tube was added 0.17 mol (38.8 grams) of 2,2-bis-(4-hydroxyphenyl)propane, refererd to hereinafter as bisphenol-A, 0.17 mol (24.8 grams) of adipic acid and 470 cc. of pyridine. Phosgene was bubbled into the stirred solution maintained at 25° to 35° C. until the mixture became viscous. The polymer was then precipitated, washed with isopropanol and dried. The resulting polymer poly(bisphenol-A adipate) had an intrinsic viscosity of 0.20.

Examples 7 through 18 are illustrative of the preparation of random carbonate-carboxylate copolyesters. In each of these examples, phosgene was bubbled into a stirred pyridine solution (470 cc. pyridine) of a difunctional acid and a dihydric phenol maintained at 25–35° C. Phosgene was added until the reaction mixture became viscous. The method of isolating and purifying the polymer was as in Example 6.

Example 7

The following reactants were used:

Bisphenol-A _____ 0.18 mol (41.2 grams).
Adipic acid _____ 0.085 (12.4 grams).
Phosgene _____ Ca. 0.34 mol (33.7 grams).

The properties of the copolyester were as follows:

Intrinsic viscosity _____ 1.1
Softening temperature (° C.) _____ 140–230

Example 8

The following reactants were used:

Bisphenol-A _____ 0.17 mol (38.8 grams).
Isophthalic acid _____ 0.085 mol (14.1 grams).
Phosgene _____ Ca. 0.33 mol (32.7 grams).

The properties of the resulting copolyester were as follows:

Intrinsic viscosity _____ .93
Softening temperature (° C.) _____ 225–255

Example 9

The following reactants were used:

Bisphenol-A _____ 0.17 mol (38.8 grams).
Azelaic acid _____ 0.085 mol (16 grams).
Phosgene _____ Ca. 0.30 mol (29.7 grams).

The properties of the resulting copolyester were as follows:

Intrinsic viscosity _____ 0.88
Softening temperature (° C.) _____ 125–185

Example 10

The following reactants were used:

Bisphenol-A _____ 0.17 mol (38.8 grams).
Terephthalic acid _____ 0.085 mol (14.1 grams).
Phosgene _____ Ca. 0.26 mol (25.7 grams).

The properties of the resulting copolyester were as follows:

Intrinsic viscosity _____ 0.96
Softening temperature (° C.) _____ 315–365

Example 11

Prepared as in Example 7, using 10.0 g. (0.091 mol) of resorcinol and 6.9 g. (0.047) of adipic acid in 75 cc. of pyridine. The copolyester softened at 40–50° C. and had an intrinsic viscosity of 0.20.

Example 12

Prepared as in Example 7, using 9.7 g. (0.048 mol) of 4,4'-dihydroxydiphenyl ether, and 4.6 g. (0.024 mol) of isophthalic acid in 75 cc. of pyridine. The copolyester had an intrinsic viscosity of 0.46 and a softening temperature of 145–60° C. It was only slightly soluble in dioxane or methylene chloride.

Example 13

Prepared as in Example 7, using 10.0 g. (0.092 mol) hydroquinone, and 6.9 g. (0.047 mol) adipic acid in 75 cc. of pyridine. The copolyester was insoluble in methylene chloride, tetrachloroethane, dioxane and benzene. It was swollen by pyridine, acetone and dimethylsulfoxide.

Example 14

Prepared as in Example 7, using 10.0 g. (0.040 mol) 4,4'-dihydroxydiphenyl sulfone and 2.9 g. (0.020 mol) adipic acid in 75 cc. of pyridine. The copolyester was soluble in methylene chloride and dioxane and had a softening temperature of 135–145° C.

Examples 15 and 16 illustrate the preparation of copolyesters using 3,6-endomethylene-Δ-4-tetrahydrophthalic acid, commercially known as "Nadic" acid, as the difunctional acid. This acid has the structure

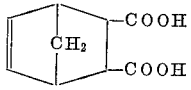

In each case copolyesters were prepared as in Example 7 by bubbling phosgene into a pyridine solution of the acid and bisphenol-A.

Example 15

This example utilized a four to one molar ratio of bisphenol-A to Nadic acid. The properties of the copolymer were as follows:

Intrinsic viscosity _____ 0.57
Softening temperature (° C.) _____ 165–180

Example 16

Example 15 was repeated using a two to one molar ratio of bisphenol-A to Nadic acid. The copolyester had a softening temperature of 175–195° C.

Example 17

This and the following example illustrate the preparation of a copolyester using a sulfur containing acid as the difunctional acid.

A copolyester was prepared as in Example 7 using a fifty to one molar ratio of bisphenol-A to acid. The acid used was thiodiglycollic acid having the structure

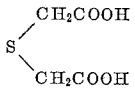

The intrinsic viscosity of the resulting copolyester was 0.78 and the softening temperature was 210–225° C.

Example 18

Example 17 was repeated using a four to one molar ratio of bisphenol-A to acid. The intrinsic viscosity of the copolyester was 0.37 and the softening temperature was 140–170° C.

Examples 19 through 22 illustrate the preparation of block carbonate-carboxylate copolyesters.

Example 19

Bisphenol-A, 0.17 mol (38.8 grams), and 0.17 mol (24.8 grams) of adipic acid were dissolved in 470 cc. of pyridine. About 25% of the theoretical amount of phosgene was bubbled into the solution. More bisphenol-A, 0.17 mol (38.8 grams), was then added with additional phosgene until a viscous end point was obtained. The polyester was precipitated and washed in the same manner as Example 6 and the following properties were obtained.

Intrinsic viscosity _____ 0.93
Softening temperature (° C.) _____ 105–145

Example 20

The same amounts of the same reactants were used as in Example 19 above. The procedure followed was likewise the same except that phosgene was added to the initial bisphenol-A adipic acid solution until the solution was viscous. The remainder of the bisphenol-A was then added in 470 cc. of additional pyridine and phosgene again added to a viscous end point. The intrinsic viscosity of the copolyester was 0.98 and the softening temperature was 125–155° C.

Example 21

Bisphenol-A, 0.17 mol (38.8 g.), was dissolved in 470 cc. pyridine and phosgene was bubbled into the stirred solution until viscous. Adipic acid, 0.085 mol (12.4 g.) was added in 470 cc. of pyridine and the addtition of phosgene continued until very viscous. The polyester was precipitated and washed as above and had the following properties:

Intrinsic viscosity _____ 0.83
Softening temperature (° C.) _____ 155–175

Example 22

In separate reaction vessels, phosgene was added to 0.17 mol each of bisphenol-A and adipic acid and to 0.17 mol of bisphenol-A, both in 470 cc. of pyridine solution. When both reaction mixtures had become viscous, the bisphenol-A reaction mixture was poured into the bisphenol-A-adipic acid mixture. After stirring for 15 minutes, a small amount of additional phosgene (0.3 gram/minute for two minutes) promoted a very viscous end point. The precipitated and washed copolyester had a softening temperature of 95–120° C.

Examples 23 and 24 illustrate the preparation of copolyesters using hydroxy acids.

Example 23

A 20 cc. solution of 10% by weight p-hydroxybenzoic acid in pyridine and an 80 cc. solution of 10% by weight bisphenol-A in pyridine were prepared and mixed. Phosgene was bubbled into the reaction mixture until a viscous end point was obtained. A clear strong film of the precipitated and washed copolyester (7540 p.s.i. tensile strength) was cast from methylene chloride solution.

Example 24

Example 23 was repeated using 30 cc. of the 10% p-hydroxybenzoic acid solution and 70 cc. of the 10% bisphenol-A solution. The resin had an intrinsic viscosity of 0.83 and a softening temperature of 230–250° C.

The process of the present invention may be used for the preparation of monomeric and polymeric esters whose uses are well known. In addition, the process of this invention may be used for the preparation of the copolyester compositions described and claimed in my copending application S.N. 679,743. Mixtures of monomeric carbonate and carboxylate esters may be used as plasticizers. Linear polyesters prepared in accordance with the invention find wide utility for the manufacture of films, fibers, molded or extruded parts and surface coatings for use in structural, decorative and electrical applications. Polyesters prepared in accordance with this invention, from acids or alcohols containing more than two functional groups, may be cross-linked and used in those applications where conventional thermosetting resins are used, as, for example, in varnishes, lamainating resins and electrical insulation material. The linear copolyesters may be used for applications more fully set out in said copending application S.N. 679,743.

What I claim as new and desire to secure by Letters Patent of the United States is:

1. A process for preparing a polyester containing carboxylate groups which comprises reacting a bishaloformate of a dihydroxy compound selected from the class consisting of a dihydric phenol and a glycol with a difunctional carboxylic acid in a substantially non-aqueous solution comprising in excess of two moles of a tertiary amine for each mole of said bishaloformate.

2. A process for preparing a copolyester containing both carboxylate and carbonate groups which comprises reacting a bishaloformate of a dihydroxy compound with a difunctional carboxylic acid and a dihydroxy compound, said dihydroxy compound being selected from the class consisting of a dihydric phenol and a glycol, in a substantially non-aqueous solution comprising in excess of two moles of a tertiary amine for each mole of bishaloformate.

3. The process of claim 2 in which the bishaloformate is a bischloroformate.

4. The process of claim 2 in which the tertiary amine is pyridine.

5. The process of claim 2 in which the carboxylic acid is adipic acid.

6. The process of claim 2 in which the carboxylic acid is isophthalic acid.

7. The process of claim 2 in which the carboxylic acid is terephthalic acid.

8. The process of claim 2 in which the carboxylic acid is azelaic acid.

9. The process of claim 2 in which the carboxylic acid is p-hydroxy benzoic acid.

10. A process for prearing a copolyester containing both carboxylate and carbonate groups which comprises reacting a bischloroformate of a dihydroxy compound selected from the class consisting of a dihydric phenol and a glycol with a difunctional carboxylic acid and 2,2-bis(4-hydroxyphenyl)-propane in a substantially non-aqueous solution comprising in excess of two moles of a tertiary amine for each mole of said bischloroformate.

11. A process for preparing a copolyester containing both carboxylate and carbonate groups which comprises reacting a bischloroformate of a dihydroxy compound selected from the class consisting of a dihydric phenol and a glycol with a difunctional carboxylic acid and 4,4'-dihydroxy diphenyl ether in a substantially non-aqueous solution comprising in excess of two moles of a tertiary amine for each mole of said bischloroformate.

12. A process for preparing a copolyester containing both carboxylate and carbonate groups which comprises reacting a bischloroformate of a dihydroxy compound selected from the class consisting of a dihydric phenol and a glycol with a difunctional carboxylic acid and 4,4'-dihydroxy diphenyl sulfone in a substantially non-aqueous solution comprising in excess of two moles of a tertiary amine for each mole of said bischloroformate.

References Cited by the Examiner

UNITED STATES PATENTS

| | | | |
|---|---|---|---|
| 2,517,965 | 8/1950 | Bohl | 260—463 |
| 2,615,914 | 10/1952 | Rehberg | 260—463 |

FOREIGN PATENTS

| | | |
|---|---|---|
| 730,599 | 5/1955 | Great Britain. |
| 1,101,386 | 3/1961 | Germany. |

WILLIAM H. SHORT, *Primary Examiner.*

C. B. PARKER, *Examiner.*

UNITED STATES PATENT OFFICE
CERTIFICATE OF CORRECTION

Patent No. 3,220,976  November 30, 1965

Eugene P. Goldberg

It is hereby certified that error appears in the above numbered patent requiring correction and that the said Letters Patent should read as corrected below.

Column 1, line 36, for "vacuumes" read -- vacuums --;
column 5, line 58, for "145-60° C." read -- 145-160° C. --;
column 8, line 24, for "prearing" read -- preparing --.

Signed and sealed this 27th day of September 1966.

(SEAL)
Attest:

ERNEST W. SWIDER
Attesting Officer

EDWARD J. BRENNER
Commissioner of Patents